April 6, 1965 A. P. BROKAW 3,177,467
ACOUSTIC VELOCITY LOGGING SYSTEM AND COMPUTER
Filed Feb. 8, 1961 5 Sheets-Sheet 1

INVENTOR
Adrian P. Brokaw
BY Robert K. Schumacher
ATTORNEY

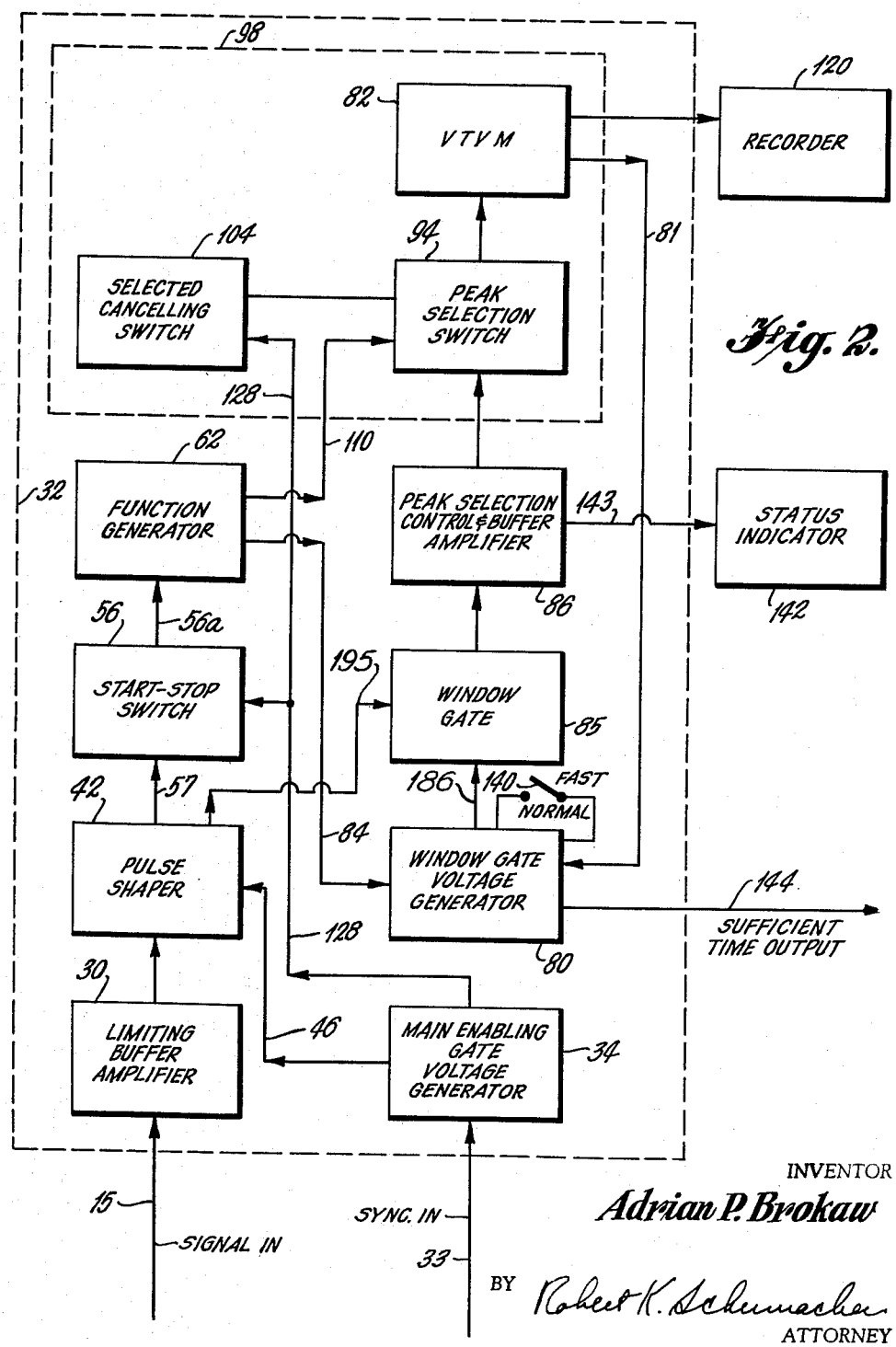

INVENTOR
Adrian P. Brokaw
BY Robert K. Schumacher
ATTORNEY

INVENTOR
Adrian P. Brokaw
BY Robert K. Schumacher
ATTORNEY

INVENTOR
Adrian P. Brokaw
BY Robert K. Schumacher
ATTORNEY

United States Patent Office 3,177,467
Patented Apr. 6, 1965

3,177,467
ACOUSTIC VELOCITY LOGGING SYSTEM
AND COMPUTER
Adrian P. Brokaw, Stillwater, Okla., assignor, by mesne
assignments, to Dresser Industries, Inc., Dallas, Tex.,
a corporation of Delaware
Filed Feb. 8, 1961, Ser. No. 87,853
13 Claims. (Cl. 340—18)

The present invention relates to an improved computer for determining the interval in time between two pulses, which interval represents information useful in an analysis, and has more particular reference to an improved computer for determining the time interval between pulses representative of information as to subsurface formations as determined by acoustic well logging tools and systems therefor.

The present invention is directed to a computer for more accurately discriminating between valid and invalid signal information, wherein the valid signal information represents time intervals for acoustic energy to pass or traverse media surrounding a bore hole, and wherein the invalid signal information represents reception of noise, etc.

The invention seeks to provide this discrimination between valid and invalid signal information in order to obtain a more accurate and unblemished "picture" of well bore conditions.

In the new computer, signal information is provided which may be of value in automatically determining proper adjustment of controlled or controllable variables in a subsurface tool.

Basically, the present invention provides a novel and improved computer for processing signal information fed into it and to provide derived information as to the status of the signal information which it has processed.

Therefore, it is an object of the invention to provide a computer in a well logging system for automatically tracking on previous measurements in order to determine the range of values into which new measurement information must fall, if they are to be considered as valid.

Also it is an object of the invention to provide a circuit to provide derived information indicating the status of signal information which the circuit has processed.

A further object of the invention is to use a visual indicator to report the status of each set of information as it is determined or derived.

A still further object of the invention is to provide automatic generation of signals valuable in determining adjustment of control variables for a subsurface tool.

The present invention is an improvement of an invention described in a copending application of the applicant, titled "Discriminating Interval Time Computer for Acoustic Well Logging Systems," filed April 15, 1959, having Serial No. 806,586, now Patent No. 3,019,413. In its preferred form, the present invention is intended to function with an acoustic velocity well logging system having an acoustic energy transmitter and at least two spaced-apart receivers, and is composed of circuitry for developing and storing a pair of voltages functionally related to the time intervals occasioned by the travel of an acoustic pulse from the transmitter past the first receiver, and from the first receiver past the second receiver, respectively. Other circuitry is included which functions to reject the next succeeding pair of receiver pulses unless they define measured intervals comparing favorably to the previous time intervals represented by the stored pairs of voltages. Further circuitry is also included from replacing previously stored voltages with new voltages upon each acceptance by the present invention of a pair of pulses from the receivers.

In other words, if the pulses emitted by the receivers define a time interval which is within the time interval represented by the previous pulses accepted by the system, the system will also accept this subsequent pair of pulses, and will replace the old stored voltage with a new voltage representing the time interval between the last accepted pair of receiver pulses. Otherwise, the pulse pair will be rejected.

Other objects and advantages will be apparent from a detailed description of the invention and from the appended drawings and claims.

In the drawings:

FIGURE 2 is a block diagram showing the details of a computer in accordance with a preferred embodiment of the invention;

FIGURES 2a and 2b are schematic circuit diagrams showing further details of the computer of FIGURE 2 (the lines A—A and B—B represent the junction of the circuits of FIGURE 2a with the circuits of FIGURE 2b);

Figure 1:
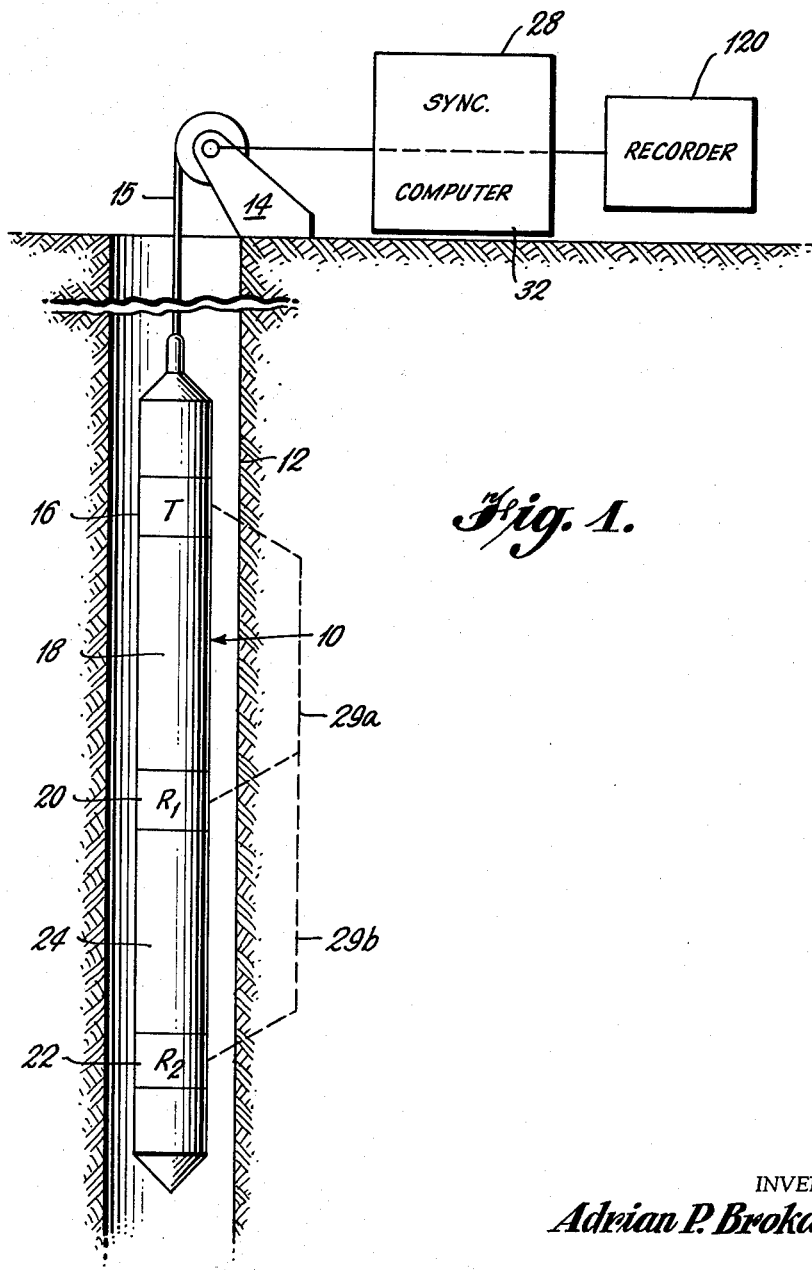
FIGURE 1 is a schematic illustration of an acoustic well logging tool in a well bore connected to the improved computer of the invention.

Referring now to FIGURES 1 and 2, there is illustrated an acoustic well logging tool 10 suspended in a well bore hole 12 from a winch 14 by a cable 15. The acoustic well logging tool 10 includes a transmitting transducer 16, an acoustically insulating section 18, a first receiving transducer 20, being spaced from the transmitting transducer by the insulating member, and a second receiving transducer 22 spaced from the first receiving transducer by another acoustically insulating member 24.

A synchronizer 28 included in equipment at the earth's surface develops a trigger pulse which is fed through the cable 15 to the logging tool 10. The trigger pulse in the logging tool through appropriate circuitry excites the transmitting transducer so that a pulse of acoustic energy is generated and thence emanated from the tool. The receiving transducer 20 senses acoustic energy transmitted from the transmitting transducer after passing along such a path as 29a through a portion of the formations surrounding the bore hole 12. The first sensing of acoustic energy by the receiving transducer 20 causes a pulse to be developed. The receiver pulse is coupled through the cable 15 to equipment on the earth's surface including a limiting buffer amplifier 30 (FIGURES 2 and 2a) of a computer 32. The second receiving transducer 22 similarly senses acoustic energy generated by the transmitting transducer 16 after passing along a path 29b. The sensing of acoustic energy by the receiving transducer 22 causes a second pulse to be produced. The second pulse is also coupled through the cable 15 to the limiting buffer amplifier 30. The subsurface apparatus provides but these two pulses per cycle although one or both may be erroneous, or even missing, and may be caused by random noises due to the tool impacting against the sides of the bore hole, cable generated noise, etc.

A computer is generally known as a device which can accept and process input information and supply useful output information derived from the input information. The processing includes using other information such as timing or synchronizing pulses and the processing is accomplished by logical circuit elements. The computer includes certain control circuits for effecting the carrying out of instructions in a proper sequence, the interpretation of each instruction, and the application of a command to other circuits in accordance with the interpretation. Although the preferred embodiment of the invention shows an analog measuring circuit, it is within the scope of the invention to use a digital measuring circuit, if desired.

The pulse from the synchronizer 28 through appropriate circuitry excites the acoustic transmitting transducer 16 in the tool and also is coupled by a conductor 33 to a main enabling gate voltage generator 34. The main enabling gate generator may generally be a monostable multivibrator, often known in the art as a univibrator. The enabling gate generator 34 produces an output pulse to circuits which respond as a gate. A gate is a circuit having an output and a plurality of inputs so designed that the output is energized when and only when a certain definite set of input conditions are met, performing the circuit function equivalent to the logical "AND." The main enabling gate generator provides one of these inputs.

Figure 2A:
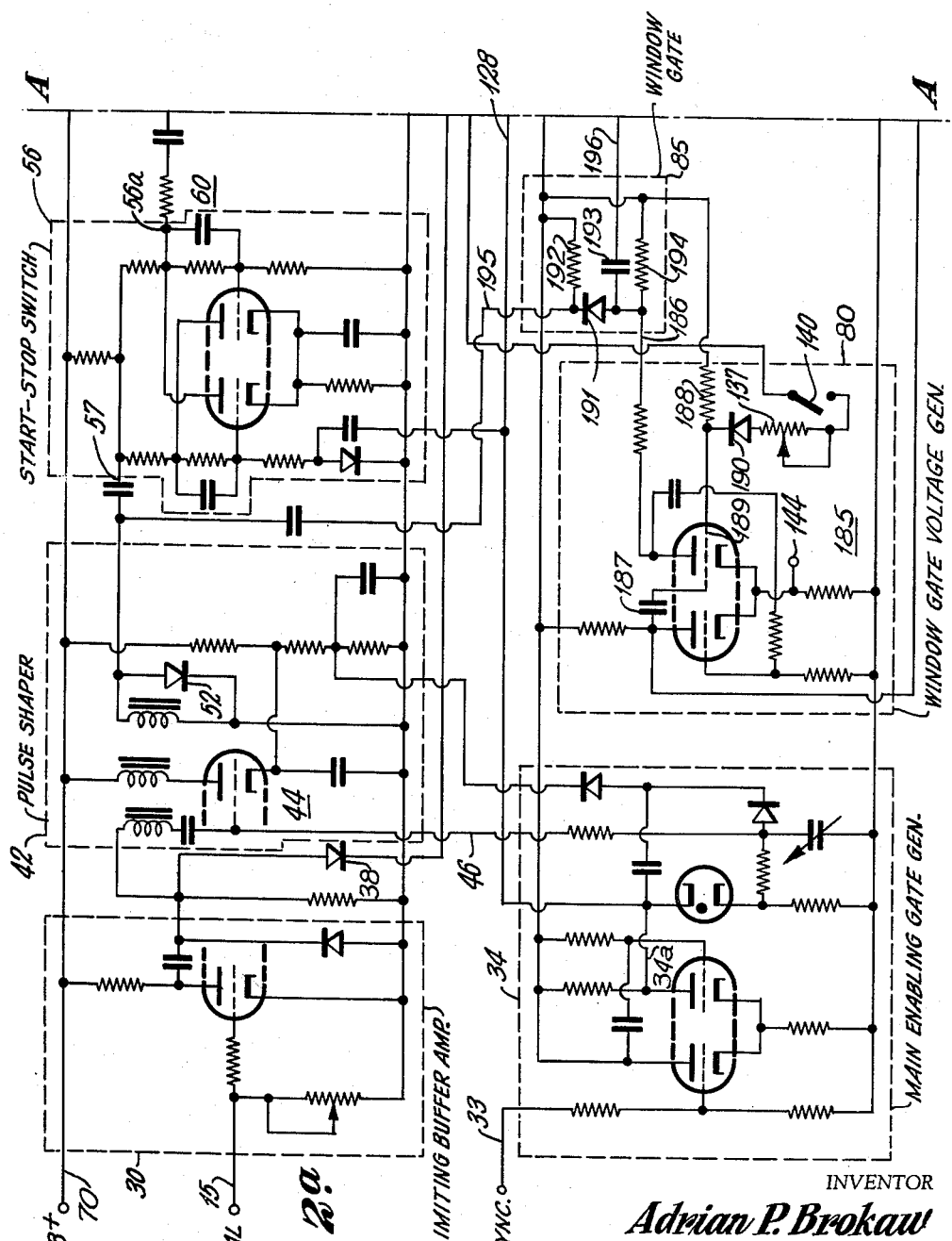
Figure 12B:
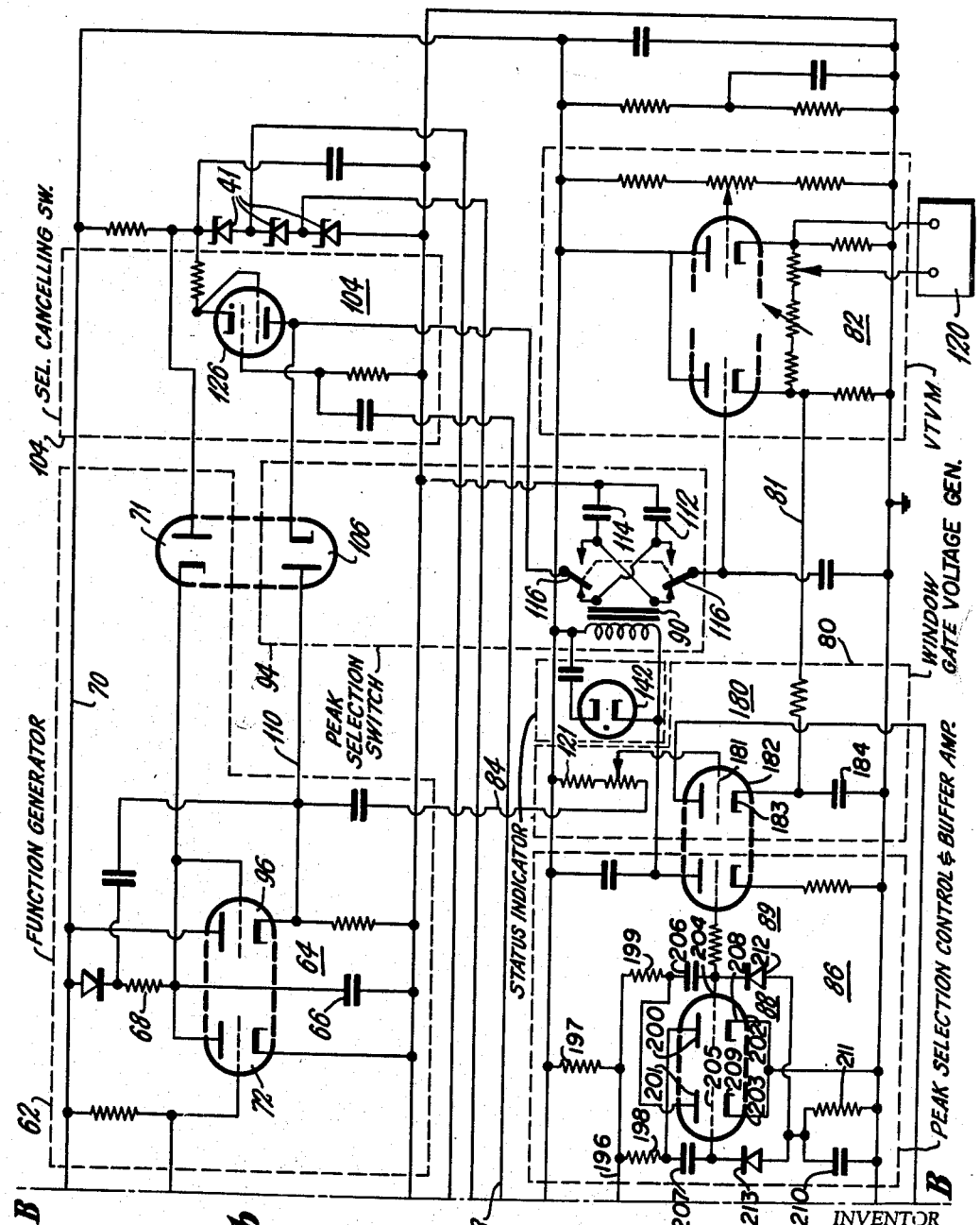

The main enabling gate generator 34 is arranged to produce an output pulse at the end of a preselected interval after actuation by the pulse from the synchronizer 28. On conductor 34a of said main enabling gate generator appears a pulse which commences with the synchronizing pulse and terminates at the end of the operating cycle of the computer. The computer 32 is OFF during the preselected interval. The preselected interval is sufficiently long to allow spurious and extraneous noises generated coincident with the trigger pulse to decay. It does not end until a time when a valid information pulse might be expected. This is the time necessary for an acoustic pulse to travel from the transmitter to the nearest receiver through formations having the greatest rate of travel of acoustic waves. When the enabling gate generator 34 produces its output pulse after the preselected interval, the output pulse produced is sufficiently long to encompass the total interval of time that pulse information is expected to be received from the tool 10 under ordinary conditions. This is the time necessary for an acoustic pulse to travel from the transmitter to the farthest receiver through formations having the least rate of travel of acoustic waves. The total interval of time is considered reasonable and adequate to receive pulses corresponding to the wide range of acoustic velocities of sound in the bore hole formations normally encountered. Output 46 of the enabling gate generator 34 is connected to a pulse shaper 42 to enable it, or actuate it into operating condition, for the duration of the output pulse. The limiting buffer amplifier 30 responds to signal information or pulses having the intervals therebetween related to information as well as extraneous noises, which is received from the tool 10 over cable 15. The limiting buffer amplifier inverts the received pulses, and rectifier 38 of FIG. 2a provides a voltage limiting feature for the inverted pulses by providing a clamping action when the voltage begins to exceed a voltage across a reference including Zener diodes 41 of FIGURE 2b. The function of the buffer amplifier 30, as is well known, is as an isolation circuit, used to avoid reaction of a driven circuit, i.e., the computer, upon the corresponding driving circuit, i.e., the tool.

The output of the limiting buffer amplifier is coupled to a pulse shaper 42, which in the preferred embodiment shown, is a triggered blocking oscillator 44. The effect of the pulse shaper is to reduce the rise-time and width of the input pulse thereto, from say about 20 microseconds to 1 microsecond.

A rectifier 52 in the output side of the blocking oscillator 44 shapes the pulse provided by the blocking oscillator by clipping the overshoot portion of the pulse beyond the first half cycle.

The first received pulse passing through the pulse shaper 42 is coupled to a start-stop switch 56 to turn it on. The second received pulse from the pulse shaper turns it OFF. The start-stop switch 56 may be of any type of bistable circuit, such as a multivibrator, flip flop or Eccles-Jordan configuration, such that each successive pulse on the signal input lead 57 will reverse the operating state of the circuit. As the first received pulse appears at the start-stop switch 56, there is a change in voltage at an output 56a of the switch. The second received pulse appearing at the start-stop switch resets the switch to its original or first state. This action is well known in bi-stable devices.

The output 56a of the start-stop switch 56 is coupled through network 60 to a function generator 62. The function generated by the generator 62 is one having single values along the X and Y coordinates of the function, generally known as a monotonic function. The monotonic function is usually a linear function and an example of a generator for the function is a bootstrap circuit 64. The ON condition of the switch 56 initiates a charging operation of a condenser 66 through a resistor 68 from a positive potential source 70. The OFF condition of the switch 56 stops altogether the charging operation of the condenser 66. The second received pulse, as mentioned above, places the switch in the OFF condition, and therefore, stops the charging of the condenser.

The peak output voltage of the function generator 62 is a precise function of the time the bootstrap circuit was charging the condenser, or that the function generator was ON. When the switch 56 is turned OFF, a clamp tube 72 discharges the condenser 66 to a voltage coupled from the Zener diodes 41 through a diode 71. The peak output value is proportional to the time interval between the first received pulse and the second received pulse.

A window gate voltage generator 80 is used to generate a gate voltage from a connection or conductor 81 from the vacuum tube voltmeter 82 at a point which has a voltage more positive than ground voltage. This positive voltage is proportional to the input of the vacuum tube voltmeter and is indicative of what is to be discussed further, as the last valid measurement of the peak selection switch 94. Another conductor 84, connected from the function generator 62 at a point where the function appears before the disconnect diode 106, is also connected to the window gate voltage generator 80. A voltage is added to the original voltage connected from the function generator, in a manner described below, and this sum is compared with the voltage from the vacuum tube voltmeter, and when these two voltages are equal, a pulse is generated by the univibrator 185. The added voltage is derived from B+ by potentiometer 121. The total resistance of potentiometer 121 is connected between B+ and conductor 84. Adjustment of the top of potentiometer 121 determines how much voltage is added to the signal on conductor 84 and applied to the comparing circuit 180 of the window gate voltage generator 80. The sum voltage is applied to grid 181 of triode 182. The voltage from the vacuum tube voltmeter is applied to cathode 183 of triode 182. As the grid voltage approaches the cathode voltage, condenser 184 discharges through the plate circuit to trigger univibrator 185 of window gate voltage generator 80. This produces a pulse called the window gate pulse over lead 186. This pulse persists for a time dependent upon the period of univibrator 185. The natural period of univibrator 185 is substantially determined by the values of condenser 187 and resistor 188. However, this natural period is modified by the connection of variable resistor 137 to grid 189 of univibrator 185 through diode 190. The variable resistor is also connected through switch 140 to a reference voltage derived from Zener diodes 41. With switch 140 open, the period of the univibrator 185 is its natural period. With switch 140 closed, the diode 190 allows the negative grid voltage that appears on grid 189 upon triggering to pass through resistor 137 thereby placing an additional load on the timing circuit, thus reducing the period of univibrator 185 and hence the duration of the window gate pulse appearing on conductor 186. The period of univibrator 185, and hence the length of the window gate pulse, may be selected by adjusting variable resistor 137.

This window gate pulse is applied to window gate 85. Window gate 85 comprises diode 191, decoupling resistor 192, coupling condenser 193 and biasing resistor 194. Biasing resistor 194 is connected between B+ and conductor 186. In absence of the window gate pulse, current is being drawn through resistor 194, developing a bias across diode 191 which prevents passage of negative signal pulses from pulse shaper 42 as they appear on conductor 195. (These pulses are negative but are not large enough to overcome this bias; positive pulses are also blocked by diode 191.) When a window gate pulse appears, current through resistor 194 is cut off and diode 191 is open to conduct all negative pulses (it still blocks positive pulses).

Thus the window gate pulse enables, or actuates the circuit function of maintaining an open passage for signals, etc., a window gate 85 for the duration of the pulse. Thus, when this window gate pulse is present, all outputs from the pulse shaper 42 are passed and coupled to the peak selection control and buffer amplifier 86. That is, the window gate pulse and the pulse from the pulse shaper must be coincident in order to trigger the peak selection control and buffer amplifier 86. The peak selection control and buffer amplifier 86 comprise a multivibrator circuit 88 having two conditions of quasi-stability, and a buffer amplifier 89. The buffer amplifier 89 couples the multivibrator circuit 88 to a relay 90 of peak selection switch 94.

Multivibrator 88 comprises load resistor 197 connected between conductor 196 and B+, resistors 198 and 199 connected between conductor 196 and plates 200 and 201, respectively, of triodes 202 and 203, respectively. These plates 201 and 200 are coupled respectively to grids 204 and 205 through condensers 206 and 207, respectively. The respective cathodes 208 and 209 are grounded. Grid bias is provided by condenser 210 which is shunted by resistor 211. Grids 204 and 205 are coupled to condenser 210 through diodes 212 and 213, respectively. This circuit is triggered in the usual way bistable multivibrators are triggered. To illustrate the operation of the circuit, suppose tube 203 becomes cutoff. Tube 202 will conduct and draw grid current until condenser 206 is charged to a voltage equal to that on conductor 196. At the instant tube 202 switches on (conducts), plate 200 is driven negative with respect to its initial condition. If we assume that condenser 207 has just been charged (by drawing grid current in tube 203) grid 205 will go negative by a large amount cutting off tube 203 (supporting the original condition). While condenser 206 is drawing grid current, tube 202 conducts heavily. As condenser 206 charges, the plate current of tube 202 diminishes to some stable value. This causes an initial overshoot at plate 200 and grid 205. This overshoot is clipped off at grid 205 (reducing the charge on condenser 207) by diode 213, and at the same time charges condenser 210. Grid 205 then rises to some steady state value below the cutoff voltage of tube 203. If a large negative pulse is applied on conductor 196, it will be coupled through resistor 198 and condenser 207 to grid 205, which has little effect since the tube is already cutoff. It will also be coupled to grid 204 where it will cut-off tube 202. The charge on condenser 207 is less than that on condenser 206 due to the clipping so that as the negative input pulse decays, grid 205 reaches cutoff voltage before grid 204 so that tube 203 now conducts and tube 202 is further cut-off by the drop across resistor 199 coupled to grid 204 by condenser 206. In this manner the circuit reverses its state once for each negative input pulse. Once the overshoot is clipped, the grid voltages remain essentially constant for a considerable interval so that the trigger sensitivity remains constant. Resistor 211 and condenser 210 are so chosen that the grid bias viltage will decay sufficiently from input to input that overshoots will be clipped, but not enough to load the grid circuits of grids 205 and 204 when the overshoot has disappeared. Since in normal operation the input pulses are substantially periodic this is relatively simple.

If the input pulses are reduced in size below the triggering level the circuit will not switch. Since there are no overshoots to charge condenser 210, it will slowly discharge through resistor 211. When the bias voltage reaches the grid voltage of the tube that is cutoff the appropriate diode will conduct and resistor 211 will begin to discharge condenser 206 or 207 (depending on which state the circuit is in). This will increase the voltage difference between the charges on the condensers 206 and 207 and the trigger sensitivity of the circuit will increase until it is triggered by one of the small input pulses. If there are no input pulses of course resistor 211 will discharge the condenser until both tubes are conducting which is an unstable condition and the circuit will switch without an input. When the circuit switches, condenser 210 is recharged and operation commences as before.

The window gate passes a small signal even when closed. In normal operation the pulses pass through the open window gate and the multivibrator is triggered on each sample. When the pulse (of the pair to be measured) occurs when the window gate is closed the multivibrator does not trigger on the reduced input. If successive reduced inputs are applied resistor 211 will increase the trigger sensitivity. By selection of components the sixth reduced input pulse is made sufficient to trigger the multivibrator.

The output voltage of the bootstrap circuit 64 of the function generator 62 is coupled from a cathode follower 96 through a disconnect diode 106 to a consecutive peak reading voltmeter 98, which includes the peak selection switch 94 coupled to a vacuum tube voltmeter (VTVM) 82 and a selected cancelling switch 104 coupled to the peak selection switch 94.

The disconnect diode 106 and a conductor 110 couple the cathode follower 96 to a storage or memory device such as a condenser 112, 114, depending of course, on which position a double pole-double throw (DP-DT) switch 116 is positioned. In the instance shown, the condenser 112 receives for storage a charge from the function generator 62. When the multivibrator circuit 88 of the peak selection control changes its condition of stability in response to having received a pulse through the window gate, the peak selection switch 94 changes the position of the DP-DT switch 116 so that the peak value of the stored information of the condenser 112 is presented to the vacuum tube voltmeter 82.

The peak value presented to the voltmeter 82 is then coupled to a utilization device or a recorder 120 of any conventional construction. The recorder provides a graphic presentation of the information relative to the time interval between acceptable pulses, when all the conditions imposed by the computer have been satisfied.

If any previous stored peak value was stored in condenser 114, the double pole-double throw switch 116 is now in a position to connect the condenser having the previously stored signal to the selected cancelling switch 104. Then at the beginning of the next cycle, the stored signal peak value is destroyed or discharged by conduction of the tube 126 in the selected cancelling switch 104. The tube 126 is rendered conductive by a pulse from the main enabling gate generator conducted over line 128.

The computer has measuring circuits that are in many details similar to that of the copending application for Letters Patent filed by Adrian P. Brokaw, filed April 15, 1959, for "Discriminating Interval Time Computer for Acoustic Well Logging Systems" having Serial No. 806,586. The functions performed by the limiting buffer amplifier, the pulse shaper, the start-stop switch, the function generator, the selected cancelling switch, the main enabling gate voltage generator, the peak selection control and buffer amplifier, the peak selection switch, the vacuum tube voltmeter, and the recorder, are equivalent to those performed by comparable components in said copending application. Reference should be made to said copending application for the operation of any circuit not fully described herein, for such circuits are the same as comparable circuits used herein except for slight changes which are obvious from the description of the improved computer using the window gate concept.

Let it be assumed that a voltage for a reading is being presented to a vacuum tube voltmeter by the peak selection switch 94, and that the computer has been in operation for at least several cycles of operation in obtaining measurements.

As was suggested above, the window gate voltage generator receives an input over conductor 81 from the vacuum tube voltmeter, this input being indicative of the last valid measurement in the peak selection switch 94. The resulting gate voltage is used by the window gate to pass all outputs from the pulse shaper that occur in time coincident with the window gate pulse.

Any output of the pulse shaper triggers the peak selection control and buffer amplifier when the window gate is operated by the window gate pulse. Now, if the last valid measurement yielded a value $t$, then as the output of the function generator rises in taking or making new and subsequent measurements, the window gate pulse will commence at a time, after the first input pulse $(t-k)$. This is due to the fact that a voltage is added by potentiometer 121, in the comparing circuit 180 of the window gate voltage generator 89, to the output of the function generator so that this sum reaches a voltage equal to the voltage representing the last valid measurement at a time which is less than the last valid measurement. This difference is $k$. The window gate pulse persists for a time $=(k+c)$. As described above, this time depends upon the period of univibrator 185. The window gate is then open from $(t-k)$ to $(t-k+k+c)=(t+c)$. If the new measurement is equal to the last valid measurement it may be considered valid. It will appear at a time $t$ and since $(t-k)<t<(t+c)$ the window gate will be open and the second signal pulse from the pulse shaper will trigger the peak selection switch. This will of course transfer the new reading to the VTVM and prepare the old reading for cancellation. If in fact, the second signal pulse falls after the first signal pulse at any time $t$, such that $(t-k)<t,<(t+c)$, it will also be considered valid information and it will find the window gate open. If, however, it does not satisfy this condition it is blocked and the peak selection control allows the previous valid reading to remain at the VTVM, and the new invalid reading is cancelled.

Since the subsurface tool takes its sample across a finite distance, for instance 3 feet, there is an absolute limit to the amount that the valid measurement may change in one sample of formation at any given practical logging speed. Measurements which indicate rates of change faster than this value must be presumed to be in error due to road noise, signal attenuation or other causes. Assume as an example, a 3 ft. spacing between the receiving transducers 20, 22, a logging speed of 120 ft./min. and velocities in the range 5,000–25,000 ft./sec. Now assume an abrupt change in velocity due to an interface in the formation. These velocities are represented by from 200 to 40 $\mu$sec./ft. acoustic time (or 600 to 120 $\mu$sec. for the 3 ft. spacing). The tool travels at two ft./sec. If it samples 12 times a second, it will take 18 samples for the measurement to make the complete transition. This means that it must change not more than $$\frac{600-120}{18}=26+\mu\text{sec./sample}$$

For the above conditions, $k$ may be adjusted to 26 or 27 $\mu$sec. with potentiometer 121 and any changes toward shorter intervals which are greater than 26 $\mu$sec./sample will be rejected by the computer as invalid signals. Under the same conditions an interface formed in the reverse fashion will decrease the acoustic time at not less than 26 $\mu$sec./sample. Therefore $c$ also should be 26 $\mu$sec. The value of $k+c$ may be adjusted with resistor 137 so that if $k$ is set first, then $c$ will be determined by resistor 137. When $k$ and $c$ are adjusted the window will be open from $t-k$ to $t+c$, $t$ being always the duration of the last accepted signal.

It is not unreasonable to expect that on occasion, the transition across an interface may be accompanied by "road noise" or signal attenuation. It is possible that if large changes in actual velocity occur simultaneously with error causing conditions, the computer will reject first the errors and then the valid signals. This occurs if the last valid reading was information derived from a sample followed by several consecutive invalid signals during which time the measurement changed to a value such that the second signal pulse now occurred outside the window gate period. This results in serious discontinuities in the record and such results must be eliminated. It is for this reason that the action of the peak selection switch is changed from a condition in the above referenced application to a modified triggered astable condition. The peak selection control is specially constructed so that it may be triggered back and forth between its quasi-stable states as often as once per sample. If it does not receive trigger pulses it will not switch until, for example, six sampling periods have elapsed since the last trigger pulse, at which time it will switch whether or not it is triggered. By this device the greatest portion of the record lost in any one time due to the mentioned circumstances will be six samples, which at the high sample rates in use will delete very little detail. Since erroneous signals are found rarely to be in large consecutive groups the above conditions will not prove troublesome in the great majority of operations.

Experience has shown that in some oil wells there are certain, usually short, "trouble spots," where, due perhaps to unusual roughness or projections, road noise signals outnumber valid signals. These road noise signals tend to indicate a shorter acoustic time than is actually the case since the second receiver 22 is more subject to this condition, and if too abundant may cause the computer to "lock on" to one of these short intervals. If this interval is shorter than the valid interval by a time greater than $c$ the computer will reject one or more consecutive valid signals, depending on how often the computer receives consecutive road noise signals falling within the window gate time. This ordinarily would not seriously detract from the record, but in the "trouble spots," the valid signals may only appear one or two at a time and the computer may continue to "lock on" to the road noise signals. Accordingly, a switch 140 has been provided so that when operating under these adverse conditions the length of time $c$ may be increased, such that all valid signals which indicate a time longer than $t-k$ will fall within the window gate. As mentioned above, with switch 140 open, the univibrator 185 operates at its normal period and the window gate pulse is thus lengthened. In this fashion the computer will "lock on" to each measurement which is greater than the one before it, but within the range of valid signals while continuing to discriminate against the road noise which tends to shorten the measurement. By so doing the computer will accept all valid signals while still rejecting many road noise signals and thus give the most accurate indication possible under the circumstances. When it is open or "fast," $c$ is extended and the computer recovers quickly from serious road noise. When the switch 140 is closed or "normal," the computer will reject erroneous signals caused by intermittent signal attenuation as well as road noise.

It should be mentioned here that the operation of this switch is normally at the discretion of the operator but may be made automatic by noting and storing elsewhere than in the vacuum tube voltmeter several consecutive samples. Large fluctuations from sample to sample would indicate a trouble spot of one form or another, and either $c$ or even $k$, or both of them, could be adjusted accordingly. From these same stored values it could also be ascertained whether or not normal operation had been resumed after short bursts of erroneous samples, obviating the need for the peak selection switch to rest itself on the sixth or other predetermined sample number, regardless of the validity of the signal.

Connected to the output of the peak selection control buffer amplifier is a lamp 142 or other type of indicator device that may be connected to lead 143. This is called the status indicator. It indicates a switching signal from the peak selection control so that an operator may know if a given sample was, or by lack of indication, was not, accepted and so act accordingly. The signal on lead 143 may be used in conjunction with another signal present on conductor 144 at the cathode of the window gate voltage generator to indicate a need to correct control variables in the subsurface tool for optimum performance. This pulse present on conductor 144 indicates that the new sample was nearly as long as or was longer than the last valid sample, or by its absence indicates a substantially shorter interval. That is, if the new sample is shorter than $t-k$, the window gate generator will produce no output at all, since the sum of the function generator voltage and the added voltage will not become equal to the voltage from the vacuum tube voltmeter.

The values $k$ and $c$ need not remain static during the logging operation. They may be controlled by an indication from the winch 14 as to logging speed, or any other convenient parameter. For instance, a tachometer indicator measuring the speed of logging could be mechanically coupled to resistor 121 and resistor 137, but of course much more sophisticated methods are possible.

When the computer begins operation, that is, when it is turned on, and input signals are applied, the voltage out of the vacuum tube voltmeter is in all likelihood indicative of zero time. If $c$ is set relatively short, the first few signals will not be considered valid (by the computer). After a few samples, six in the example computer described, one of these signal pairs will be accepted. If the second pulse of the next pair falls within the limits of the window gate, as will be the case of valid signals when the logging tool is stationary in the well, the next pair will also be accepted and the logging operation may commence.

Figure 3:
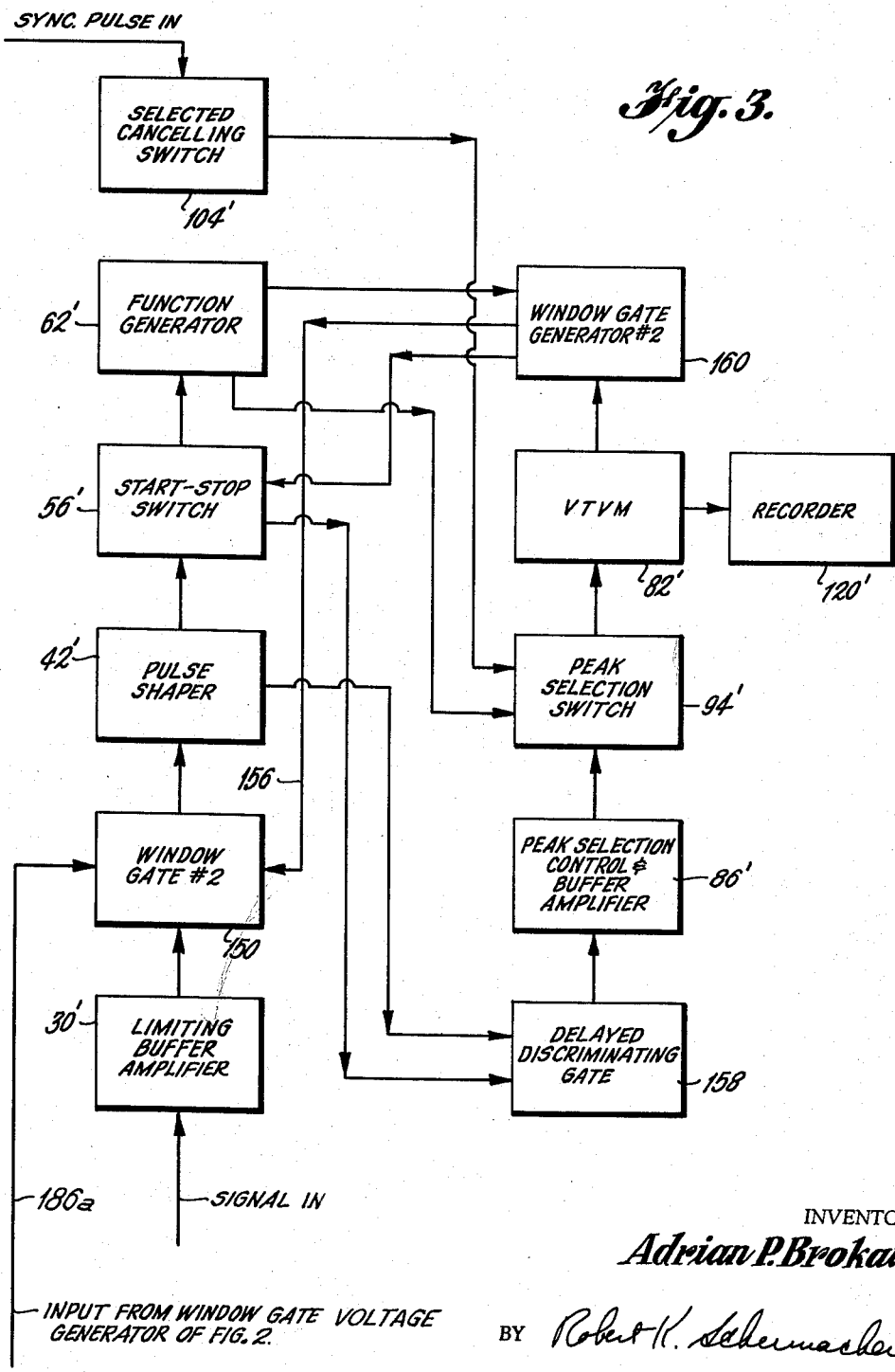
FIGURE 3 is an alternate arrangement of a block diagram of a computer within the scope of the preesent invention.

It follows that if the interval between the synchronizing pulse, or transmitter firing pulse and the first receiver signal were also measured by a similar system, it would be possible to generate two window gate pulses, one controlled by a pulse related to the interval between the synchronizing pulse and the first signal pulse, hereafter called window gate pulse #1, and the second by a pulse related to the interval between the first signal pulse and the second signal pulse, hereafter called window gate pulse #2. (This is the window gate pulse described in connection with FIGURE 2.) If this were done, it would then become possible to control the acceptance or rejection of a sample according to both limits. As shown in FIGURE 3, this may be done by generating a first window gate pulse which is controlled by the additional measuring circuits in a manner similar to the described window gate pulse #2. This window gate pulse #1 can be produced by a circuit similar to that of FIGURE 2 but in which the transmitter pulse is also applied on input lead 15 and the output of window gate generator 80 is used to disable pulse shaper 40 briefly to prevent action by the pulse from the second receiver. It also resets start-stop switch 56. This circuit then operates to generate window gate pulse #1 which depends upon the time of transit of acoustic energy from the transmitter to the first receiver. The acceptance interval can be adjusted in a manner similar to that described above in connection with FIGURE 2. This window gate #1 would appear on conductor 186 of FIGURE 2 and may be applied over conductor 186a to window gate #2, element 150 in FIGURE 3, which is placed between the limiting buffer amplifier 30' and the pulse shaper 42'. This gate can then be controlled by the first window gate pulse voltage generator to set limits on the rate of change of interval between the synchronizing pulse and the first signal pulse. It is also obviously necessary to open this window gate 150 in response to the second window gate pulse on conductor 156 so that the second signal pulse may pass through it also. Provided window gate 150 is open in accordance with the above, the valid first pulse is passed to pulse shaper 42; and through the action of start-stop switch 56' starts function generator 62'. The start-stop switch starts the action of delayed discriminating gate 158 which may operate similarly to the delayed discriminating gate of my above noted copending application S.N. 806,586. The second pulse is passed to turn off the function generator and is also passed through the delayed discriminating gate 158 to peak selection control and buffer amplifier 86' which operates peak selection switch 94' to pass a signal to vacuum tube voltmeter 82' for recording on recorder 120'. Window gate voltage generator 160 compares the voltage on vacuum tube voltmeter 82' with a voltage from function generator 62' in the same manner as window gate voltage generator 80 of FIGURE 2 to derive the appropriate window gate pulse #2. In addition the termination of window gate pulse #2 is applied to start-stop switch 56' to reset it. The synchronizing pulse operates the selected cancelling switch 104' directly rather than through a main enabling gate voltage generator. Generally the circuit components operate in substantially the same manner as described above for the comparable components of the circuit of FIGURE 2.

Where additional receivers are used, these circuits can be further compounded so that information is accepted for recording only when the pulses at all of the receivers appear within preselected ranges related to the next previous accepted measurements.

Although the unit described uses an analog function generator, a digital function generator may be used if greater accuracy is desired. A digital function generator would include a start-stop switch which may gate on a string or series of time calibrated pulses which may be fed into a counter. If, for example, the pulses are 100 m$\mu$sec. apart and the interval to be measured is 200 $\mu$sec. the count will be 2,000. This of course represents 200,000 m$\mu$sec.=200 $\mu$sec. Two storage units must be provided for each count in the counter and the peak selection must switch between the two banks of storage units. The VTVM may be replaced by a suitable buffer to drive a digital recorder, or a digital to analog converter to drive a conventional strip chart or other recorder. In the case of a digital output the window gate generator detects coincidence of the instantaneous count in the function generator and a number equal to the buffer output less $k$. If digital to analog conversion is used, the conversion may be made between the function generator and peak selection switch. If the conversion is made as the count progresses, the analog function produced may be used to trigger the window gate generator as in the analog version.

From the above descriptions and obvious extensions thereof, it can be seen that the "past history" of the logging information may be put to good use in well logging instruments, and in particular in acoustic velocity well logging.

Preferred embodiments of the invention have been described. Various changes and modifications, however, may be made within the scope of the invnetion as set forth in the appended claims.

I claim:

1. A computer in an acoustic well logging system for discriminating between valid signal information represented as the time interval between an accepted pair of pulses and invalid signal information represented as the time interval between an unaccepted pair of pulses, said computer comprising storage means for storing the information representing the time interval between an accepted pair of pulses, acceptance means connected to said storage means for accepting a subsequent pair of pulses when the time interval therebetween is within a predetermined range of the time interval represented by the information stored in said storage means, substituting means connected to said acceptance means and said storage means for substituting the information representing the time interval between an accepted subsequent pair for the information previously stored in said storage means.

2. The computer of claim 1 further characterized by including means connected to said acceptance means for indicating to an observer each acceptance of a pair of pulses by said acceptance means.

3. A computer in an acoustic well logging system for discriminating between valid signal information represented as the time interval between an accepted pair of pulses and invalid signal information represented as the time interval between an unaccepted pair of pulses, said computer comprising storage means for storing the information representing the time interval between an accepted pair of pulses, acceptance means connected to said storage means for accepting a subsequent pair of pulses when the time interval therebetween is within a predetermined range of the time interval represented by the information stored in said storage means and for accepting a later pair of pulses after a predetermined number of consecutive unaccepted pairs of pulses even though the time interval between the pulses of said later pair is not within said predetermined range, and substituting means connected to said acceptance means and said storage means for substituting the information representing the time interval between an accepted subsequent pair for the information previously stored in said storage means.

4. A computer in an acoustic well logging system for discriminating between valid signal information represented as the time interval between an accepted pair of pulses and invalid signal information represented as the time interval between an unaccepted pair of pulses, said computer comprising storage means for storing the information representing the time interval between an accepted pair of pulses, acceptance means connected to said storage means for accepting a subsequent pair of pulses when the time interval therebetween is within a predetermined range of the time interval represented by the information stored in said storage means, said predetermined range including only such time intervals as would result from no more than the maximum change in acoustic velocity that would be reasonably expected, and substituting means connected to said acceptance means and said storage means for substituting the information representing the time interval between an accepted subsequent pair for the information previously stored in said storage means.

5. A computer in an acoustic well logging system for discriminating between valid signal information represented as the time interval between an accepted pair of pulses and invalid signal information represented as the time interval between an unaccepted pair of pulses, said computer comprising storage means for storing the information representing the time interval between an accepted pair of pulses, acceptance means connected to said storage means for accepting a subsequent pair of pulses when the time interval therebetween is within a selected one of two predetermined ranges of the time interval represented by the information stored in said storage means, one of said predetermined ranges including only such time intervals as would result from no more than the maximum change in acoustic velocity that would be reasonably expected and the other of said predetermined ranges including the range of said one range and also longer time intervals, said acceptance means including means for selecting between said two predetermined ranges, and substituting means connected to said acceptance means and said storage means for substituting the information representing the time interval between accepted subsequent pair for the information previously stored in said storage means.

6. A computer in an acoustic well logging system for discriminating between valid signal information represented as the time interval between an accepted pair of pulses and invalid signal information represented as the time interval between an unaccepted pair of pulses, said computer comprising storage means for storing the information representing the time interval between an accepted pair of pulses, acceptance means connected to said storage means for accepting a subsequent pair of pulses when the time interval therebetween is within a predetermined range of the time interval represented by the information stored in said storage means, said predetermined range including only such time intervals as would result from no more than the maximum change in acoustic velocity that would be reasonably expected, said acceptance means including means for continuously adjusting said range at the will of the logging operator, and substituting means connected to said acceptance means and said storage means for substituting the information representing the time interval between an accepted subsequent pair for the information previously stored in said storage means.

7. A computer in a cyclic acoustic well logging system for measuring the time interval between the arrival of acoustic energy at a pair of spaced receivers following transmission of acoustic energy from an acoustic transmitter wherein each of said receivers produces a characteristic electrical pulse no more than once each cycle after transmission of acoustic energy, said computer comprising storage means for storing the information representing the time interval between an accepted pair of receiver pulses, acceptance means connected to said storage means for accepting a subsequent pair of pulses when the time interval therebetween is within a predetermined range of the time interval represented by the information stored in said storage means, provided the first pulse of said pair follows said transmission after a predetermined time interval, and substituting means connected to said acceptance means and said storage means for substituting the information representing the time interval between an accepted subsequent pair for the information previously stored in said storage means.

8. A computer in a cyclic acoustic well logging system for measuring the time interval between the arrival of acoustic energy at a pair of spaced receivers following transmission of acoustic energy from an acoustic transmitter wherein each of said receivers produces a characteristic electrical pulse no more than once each cycle after transmission of acoustic energy, said computer comprising storage means for storing the information representing the time interval between an accepted pair of receiver pulses, acceptance means connected to said storage means for accepting a subsequent pair of pulses when the time interval therebetween is within a predetermined range of the time interval represented by the information stored in said storage means, provided the first pulse of said pair follows said transmission after a first predetermined time interval and the second pulse of said pair follows said transmission within a second predetermined time interval, and substituting means connected to said acceptance means and said storage means for substituting the information representing the time interval between an accepted subsequent pair for the information previously stored in said storage means.

9. A computer in a cyclic acoustic well logging system for measuring the time interval between the arrival of acoustic energy at a pair of spaced receivers following transmission of acoustic energy from an acoustic transmitter wherein each of said receivers produces a characteristic electrical pulse no more than once each cycle after transmission of acoustic energy, said computer comprising storage means for storing the information representing the time interval between an accepted pair of receiver pulses;

acceptance means connected to said storage means for accepting a subsequent pair of pulses when the time interval therebetween is within a predetermined range of the time interval represented by the information stored in said storage means, provided the first pulse of said pair follows said transmission after a predetermined time interval and the second pulse of said pair follows said transmission within a second predetermined time interval, said predetermined range including only such time intervals as would result from no more than the maximum change in acoustic velocity that would be reasonably expected, said first predetermined time interval being no greater than the time required for acoustic energy to pass from said transmitter to the nearest of said receivers at the greatest acoustic velocity normally encountered in the earth formations being measured, and said second predetermined time interval ending no later than the time required for acoustic energy to pass from said transmitter to the farther of said receiver at the lowest acoustic velocity normally encountered in the earth formations being measured; and substituting means connected to said acceptance means and said storage means for substituting the information representing the time interval between an accepted subsequent pair for the information previously stored in said storage means.

10. A computer in a cyclic acoustic well logging system for measuring the time interval between the arrival of acoustic energy at a pair of spaced receivers following transmission of a pulse of acoustic energy from an acoustic transmitter wherein each of said receivers produces a characteristic electrical pulse no more than once each cycle after transmission of acoustic energy, said computer comprising first storage means for storing the information representing the time interval between an accepted first pair of pulses consisting of a transmitted pulse and a receiver pulse of the same cycle, first acceptance means connected to said first storage means for accepting a subsequent first pair of pulses when the time interval therebetween is within a predetermined range of the time interval represented by the information stored in said first storage means, first substituting means connected to said first acceptance means and first said storage means for substituting the information representing the time interval between an accepted subsequent first pair of first pulses for the information previously stored in said first storage means, second storage means for storing the information representing the time interval between an accepted second pair of pulses consisting of the receiver pulse of said first pair of pulses and the other receiver pulse of the same cycle, second acceptance means connected to said first acceptance means and to said second storage means for accepting a subsequent second pair of pulses when the time interval therebetween is within a predetermined range of the time interval represented by the information stored in said second storage means provided said first acceptance means accepts the first pair of the same cycle, and second substituting means connected to said second acceptance means and said second storage means for substituting the information representing the time interval between an accepted subsequent second pair of pulses for the information previously stored in said second storage means.

11. A computer in a cyclic acoustic well logging system for measuring the time interval between the appearance of acoustic energy at at least three spaced transducers upon transmission of a pulse of acoustic energy from an acoustic transmitter wherein the appearance of acoustic energy at each of said transducers occasions a characteristic electrical pulse no more than once each cycle, which cycle commences with transmission of acoustic energy, said computer comprising first storage means for storing the information representing the time interval between an accepted first pair of said pulses of the same cycle, first acceptance means connected to said first storage means for accepting a subsequent first pair of pulses when the time interval therebetween is within a predetermined range of the time interval represented by the information stored in said first storage means, first substituting means connected to said first acceptance means and said first storage means for substituting the information representing the time interval between an accepted subsequent first pair of first pulses for the information previously stored in said first storage means, second storage means for storing the information representing the time interval between an accepted second pair of pulses of said cycle, second acceptance means connected to said first acceptance means and to said second storage means for accepting a subsequent second pair of pulses when the time interval therebetween is within a predetermined range of the time interval represented by the information stored in said second storage means provided said first acceptance means accepts the first pair of the same cycle, and second substituting means connected to said second acceptance means and said second storage means for substituting the information representing the time interval between an accepted subsequent second pair of pulses for the information previously stored in said second storage means.

12. A signal processing apparatus for measuring time intervals between a series of first and second pulses forming a pulse pair and a synchronizing pulse that precedes the pulse pair, first voltage means storing the last valid information of the time interval between the synchronizing pulse and the said apparatus comprising first pulse, second voltage means storing the last valid information of the time interval between the first and second pulses, a first function generator interconnected with said first voltage means and producing a voltage related to the time interval between the synchronizing pulse and the first pulse, a second function generator interconnected with said second voltage means and producing a measurement of the time interval between the first and second pulses, a first gate voltage generator interconnected with said first function generator and producing a first gate voltage when the first function generator has produced a voltage within a predetermined range of the voltage stored in said first voltage means, a second gate voltage generator interconnected with said second function generator and producing a second gate voltage when the second function generator has produced a voltage within a predetermined range of the voltage stored in said second voltage means, said first and second gate voltage generators each being further adapted such that their respective voltages each terminate after a respective predetermined time during which said first and second pulses, respectively, may be received if they are to indicate valid information.

13. The apparatus of claim 12 further including a gate operated by said first and second gate voltages to pass said first and second pulses as indicating valid information, and means for deriving an electrical signal indicative of the time interval between said first and second pulses and for substituting said derived signal for said last valid information stored in said second voltage means only when both said first and second pulses are passed by said gate.

References Cited by the Examiner

UNITED STATES PATENTS

| 2,832,044 | 4/58 | Bliss | 328—129 |
| 2,950,463 | 8/60 | Brunn | 340—167 |
| 2,982,943 | 5/61 | Isaacson et al. | 340—18 |
| 3,193,644 | 8/63 | Burton | 340—18 |

FOREIGN PATENTS 652,606  4/51  Great Britain.

SAMUEL FEINBERG, *Primary Examiner.*

NEIL C. READ, CHESTER L. JUSTUS, BENJAMIN A. BORCHELT, *Examiners.*